UNITED STATES PATENT OFFICE.

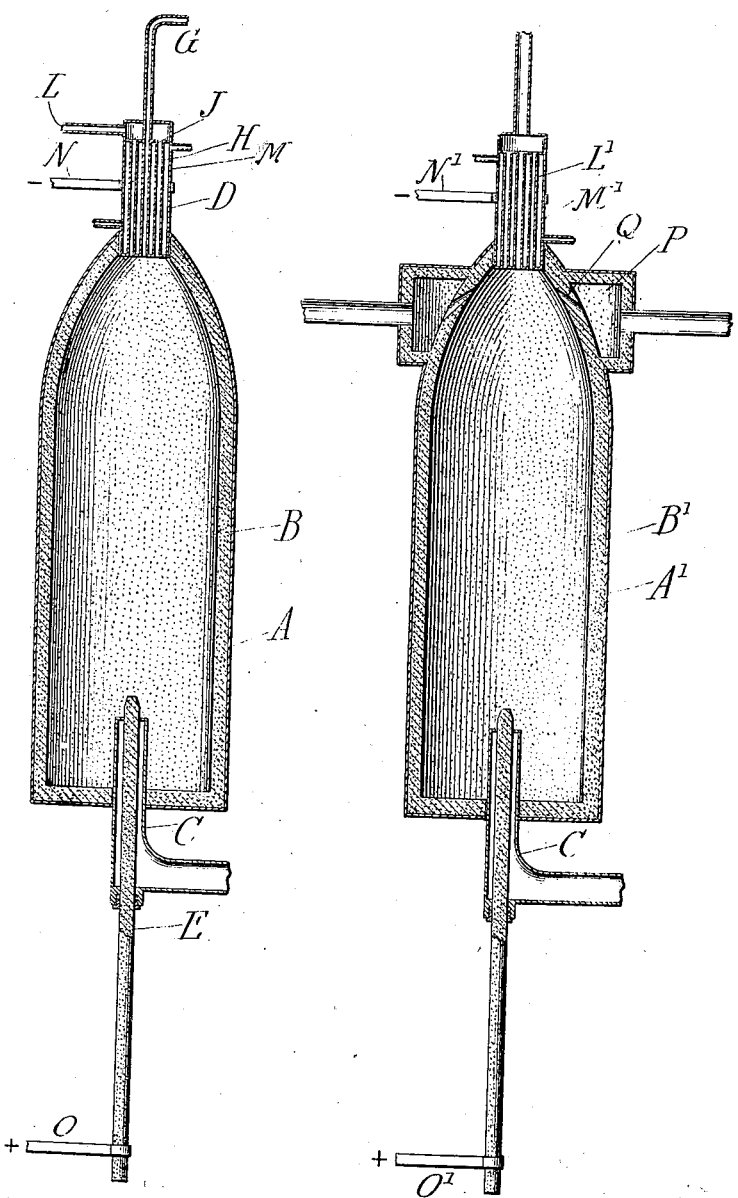

LELAND L. SUMMERS, OF CHICAGO, ILLINOIS.

PROCESS FOR PRODUCING REACTIONS IN GASES AT HIGH TEMPERATURES AND APPARATUS FOR PRACTISING THE SAME.

1,125,208.  Specification of Letters Patent.  Patented Jan. 19, 1915.

Application filed June 14, 1913. Serial No. 773,594.

*To all whom it may concern:*

Be it known that I, LELAND L. SUMMERS, a citizen of the United States, residing at Chicago, in the county of Cook and State of Illinois, have invented a new and useful Improvement, in Processes for Producing Reactions in Gases at High Temperatures and Apparatus for Practising the Same, of which the following is a specification.

My invention relates more particularly to the synthesis of gaseous compounds requiring a very intense degree of heat and in the following specification is described more specifically with reference to compounds of nitrogen such as oxids (NO, $NO_2$, etc.) ammonia ($NH_3$) hydrocyanic acid (HCN) cyanid of ammonia ($NH_4CN$), etc., but the specific description is by way of exemplification only and both the process and apparatus are capable of use for the synthesis of other compounds and may be variously modified without departing from my invention. In the following claims, however, I have endeavored to define the scope of my invention as distinguished from the prior art so far as it is now known to me without, however, relinquishing or abandoning any part thereof.

The difficulty in effecting the synthesis of the gases with which my invention has to do arises, as it is generally agreed, from the fact that one of the gases, to wit, the nitrogen is inert, or, in other terms the molecular bonds between the atoms of the gas are strong and have to be weakened or destroyed before the gas will enter into combination with any other element. For this reason the electric arc has been long resorted to as a means for raising the temperature of the gases to the point at which the bonds are weakened or severed to permit new combinations to be formed. Unfortunately, however, the range of temperatures of synthesis of the gases substantially corresponds to that of the dissociation of the formed compounds so that in any process of this character the two reactions are taking place simultaneously and if the heat is maintained for a sufficient period equilibrium is established, that is to say, the reactions in the two directions become equal and the proportion of uncombined gases and compounds becomes substantially uniform, varying with the temperature. If, however, the heating is discontinued and the gases permitted to cool before they reach temperatures at which reaction ceases, they pass through certain intermediate temperatures at which equilibrium between the components and compounds involves a much smaller proportion of the compound than at the higher temperatures. It is, therefore, desirable to cool the gases resultant from the reaction as rapidly as possible through these intermediate temperatures in order to avoid reduction in the percentages of the compounds. It is further to be noted that in most of the high temperature synthesis processes one of the gases only is inert and requires a high degree of heat to overcome its molecular bond. Nitrogen which is a usual component of the compounds formed by processes of this character is peculiarly inert while the other gases with which it is to be united are comparatively active requiring little or no heating to prepare them for combination. In the practice of my improved process the more inert gas, (in the specific illustration nitrogen) is subjected to a prolonged heating in the arc and when at its maximum temperature is brought into intimate mixture with the more active gas or gases the mixture remaining for an instant only in the heat of the arc and then being immediately removed to a point where it is at a substantially lower temperature.

In the accompanying drawings I have illustrated two forms of arc furnace in which the process can be carried out, Figure 1 illustrating one form in vertical section and Fig. 2 the other form in similar view.

Turning first to Fig. 1 the furnace is shown as comprising a shell A of iron or other similar metal having a lining B of firebrick or fire clay, the general shape of the furnace being cylindrical but tapered at one end. The arc is struck lengthwise of the furnace from an electrode C at the bottom thereof to an electrode D at the top, both of which electrodes may, if desired, be water-cooled, though but one is so shown. The lower electrode comprises a tube through which the more inert gas may be fed and a longitudinally adjustable electrode E which is employed only for drawing the arc, it being thrust upwardly into proximity of the upper electrode prior to the passage of the current through the furnace and then after the arc has been struck withdrawn so that the arc is maintained between the tube C and the upper electrode D. The latter comprises a central tube G through which the more active gas or gases which are to take part in the reaction are fed and an annular series of tubes H immediately surrounding the first named tube but separated therefrom by a water space J and constituting an outlet for the furnace connected to the exhaust pipe L. The tubes H are also completely surrounded by the jacket M, and conductors for leading the current to the electrodes are illustrated diagrammatically at N and O. Either direct or alternating current may be used for the heating effect and for the former it is for most purposes immaterial in which direction is the flow.

Before describing the operation of the furnace I will describe the modified form since the operation of the two is substantially identical. Turning now to Fig. 2 it will be seen that the body of the furnace and the electrode are substantially as in Fig. 1 but no re-agent is supplied through the upper electrode which acts as a passage only for the products of the reaction withdrawn from the furnace through the series of pipes L' which are cooled by the water jacket M'. The more active gas or re-agent is supplied through the chamber P from which a series of upwardly directed openings Q lead to the neighborhood of the upper electrode. These openings may be placed more or less close to the electrode according to the length of time to which it is purposed subjecting the more active re-agent. The current is fed to the furnace at N' O' substantially as described in connection with the earlier described form of furnace.

In using my process and furnace an arc is first drawn in the manner described and the more inert gas fed in at the lower electrode, at a speed which is dependent upon the length of time it is desired to subject each particle of the gas to the heat of the arc. The more active re-agent is fed in at G, in case the modification of Fig. 1 is used, or at Q, in case the modification of Fig. 2 is used, and the resultant mixture of gases immediately withdrawn through the water-cooled electrode. In the form shown in Fig. 1 the mixture, in case no considerable pressure were used would be exposed to the heat of the arc only during the time that its more active component could pass from the end of the tube G within the furnace to the ends of the outlet tubes H. In the form of furnace shown in Fig. 2 the mixture would be subjected a considerably longer period by reason of the greater distance of the orifices or passages Q from the inner end of the water-cooled exhaust. The reduction of temperature within the water-cooled electrode to a degree below the reaction temperatures is almost instantaneous and therefore but little time is afforded for the compounds formed to become dissociated into their elements. Obviously the length of time the component gases and the mixture are subjected to the heat of the arc may be regulated by adjusting their feed. The rapidity of cooling may of course be increased by increasing the number of outlet pipes or openings and diminishing their cross-sectional area or using some more active cooling agent than water such as one of the well known refrigerants. I have found in actual practice that so quickly are the products of the reaction taken from the temperature of the arc furnace through the ranges of temperature at which they are subject to association that some of the most readily dissociated compounds may be obtained in my furnace in considerable quantities of which substances I may name ammonia as one. The products of the reaction of course depend upon the reacting gases which are fed to the furnace. In case oxygen and nitrogen are the gases treated the products will be the oxids of nitrogen and in case hydrogen and nitrogen be subjected to the treatment ammonia will be formed, the nitrogen being the more inert gas in either case. I have found, however, that my process and apparatus is unusually well adapted for the treatment of nitrogen and the mixed gases resulting from retort coke processes which when subjected to the furnace treatment together with nitrogen yield a number of valuable products among the most important of which may be mentioned cyanogen and cyanid of ammonia. However, as stated above these suggested reactions are only a few of many which will occur to those skilled in the art.

I claim:

1. A process for the synthesis of compounds at high temperatures comprising heating the more inert component in the electric arc, mixing the same with the more active component and immediately withdrawing the resultant gases to a cooled zone.

2. In an electric furnace, a refractory chamber, a pair of electrodes arranged respectively at opposite ends of said chamber, means for supplying a more inert gas at one end of the chamber and means for supplying a more active re-agent at the other end of the chamber and withdrawing the same.

3. In an electric furnace, a furnace chamber, electrodes arranged at the opposite ends thereof, means for introducing a gas at one end of the chamber, means for introducing a gas at the other end of the chamber, and water-cooled means for withdrawing the products of the reaction at the last named end.

4. In an apparatus of the class described, a furnace chamber, an electrode and means for introducing a gas at one end of the chamber, means for introducing a gas at the other end of the chamber and a cooled electrode located at the last named end and provided with passages for the products of the reaction.

5. In an apparatus of the class described, a furnace chamber, electrodes at opposite ends thereof, means for supplying an inert gas to said chamber, means for supplying an active gas near one of the electrodes and outlet passages near the last named electrode for the products of reaction.

6. In an apparatus of the class described, a furnace chamber, a pair of electrodes, one of said electrodes being provided with passages for the products of the reaction, means for supplying an inert gas to said chamber at a point remote from the outlet passages and means for supplying an active gas at a point adjacent the outlet passages.

7. In a device of the class described, a furnace chamber, a pair of electrodes therein, one of which is cooled and provided with passages for the escape of products of the reaction and means for supplying an inert gas at a point remote from said outlet and for supplying an active gas at a point adjacent the outlet.

8. In a device of the class described, a chamber, a pair of electrodes therein, one of which is cooled and provided with an inlet for gas and an outlet for products of the reaction and means for supplying a comparatively inert gas at a point remote from the last said electrode.

LELAND L. SUMMERS.

Witnesses:
JOHN B. MACAULEY,
ROBERT DOBBERMAN.